(12) United States Patent
Yoshikawa

(10) Patent No.: US 7,154,615 B2
(45) Date of Patent: Dec. 26, 2006

(54) IMAGE FORMING APPARATUS CAPABLE OF ADJUSTING PAPER EJECTION TRAY HEIGHT

(75) Inventor: Tomoyasu Yoshikawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 10/277,748

(22) Filed: Oct. 23, 2002

(65) Prior Publication Data

US 2003/0090715 A1     May 15, 2003

(30) Foreign Application Priority Data

Nov. 15, 2001    (JP)   ............................. 2001-350564

(51) Int. Cl.
*G06K 15/16* (2006.01)
(52) U.S. Cl. .................................................. 358/1.12
(58) Field of Classification Search .................... None
See application file for complete search history.

(56) References Cited

U.S. PATENT DOCUMENTS 5,957,450 A * 9/1999 Kida et al. .................. 271/291
6,279,892 B1 * 8/2001 Yoshida et al. .......... 270/58.02

FOREIGN PATENT DOCUMENTS

JP      2001-31320      2/2001

\* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

An image forming apparatus to which image data output is requested by an operation of a terminal unit, the apparatus including: a paper-ejection tray part which stores an image formed sheet, and is disposed at a sheet-post-processing part in a vertically movable manner, wherein a height of the paper-ejection tray part can be arbitrarily set based on a request from the terminal unit.

The terminal unit registers an identification code for identifying a user thereof and paper-ejection tray height information for each of the identification codes in a database, and the height information of the paper-ejection tray is automatically sent based on the identification code entered by the user operating the terminal unit.

22 Claims, 7 Drawing Sheets

IMAGE FORMING APPARATUS CAPABLE OF ADJUSTING PAPER EJECTION TRAY HEIGHT

BACKGROUND OF THE INVENTION

1. Field of the Invention

The present invention relates to an image forming apparatus capable of being used by operators, who are seated on wheelchairs, etc., in addition to physically able operators, who are standing. More particularly, the present invention relates to an image forming apparatus capable of adjusting a paper-ejection tray height.

2. Description of the Related Art

In recent years, in image forming apparatuses, such as copying machines, complex machines, printers, etc., multi-functional image forming apparatuses having functions of, for example, setting the number of copies, adjusting image density, sorting and stapling by an accessory unit, have become widespread. These image forming apparatuses are designed on the basis that their height from a floor is best suited for a normal healthy operator, who is standing, to comfortably use them.

At the same time, image forming apparatuses, such as copying machines, complex machines, printers, etc., which are connected to a network, and function as printer servers capable of being shared for use by a plurality of users, have become rapidly popular.

However, in almost all cases, an operation part of such an image forming apparatus is fixedly attached to the apparatus, and its height from the floor cannot be changed. Therefore, in some cases, for a person, who is seated on a wheelchair, an operation part of an image forming apparatus is too high, thereby making it difficult to operate. Consequently, assuming the case where an operator, who is seated on a wheelchair, uses an image forming apparatus, a proposal has already been made in which an image forming apparatus itself is made to be movable upward and downward.

However, an image forming apparatus, which is movable upward and downward itself, has a disadvantage in terms of cost. Further, when adopting this mechanism to a large-size image forming apparatus, a problem arises in operationality in use.

Also, in the conventional image forming apparatus, when a printout request is made from a terminal unit, etc., to an image forming apparatus connected to a network, regarding a paper-ejection tray part, which is an output-result sheet storage part, a height control in consideration of an operator, who is seated on a wheelchair, has not been possible.

SUMMARY OF THE INVENTION

The present invention is made in view of the above-described problem, and an object of the invention is to provide an image forming apparatus in which a height of the paper-ejection tray part can be arbitrarily set based on a request from a terminal unit, and even when an operator, who is seated on a wheelchair, can take out sheets at a position, which makes it easy to operate the apparatus.

In order to solve the above-described problem, in the present invention, an image data output is preferably requested by an operation of a terminal unit via a network, a paper-ejection tray part, which stores an image-formed sheet, is disposed at a sheet-post-processing part in a vertically-movable manner, and a height of the paper-ejection tray part can be arbitrarily set based on a request from the terminal unit.

Also, in the present invention, the terminal unit preferably registers an identification code for identifying a user of the unit and paper-ejection tray height information for each of the identification codes in a database, and the height information of the paper-ejection tray is automatically sent based on the identification code entered by the user operating the terminal unit.

As above-described in detail, in the present invention, the height of a paper-ejection tray part can be arbitrarily set based on a request from a terminal unit. Thus, it becomes possible for a user to set the paper-ejection tray part at a height, which makes it easy to operate the apparatus, and even when a user is seated on a wheelchair, he or she can take out sheets at a position, which makes it easy to operate the sheets at a position, which makes it easy to operate the apparatus. Moreover, since the paper-ejection tray part is only moved upward and downward, the present invention has an advantage in that its structure is simple and it can be manufactured at a low cost.

Further objects, features and advantages of the present invention will become apparent from the following description of the preferred embodiment with reference to the attached drawings.

DESCRIPTION OF THE PREFERRED EMBODIMENTS

In the following discussion, a specific description will be given of an embodiment of the present invention based on the drawings.

Figure 1:
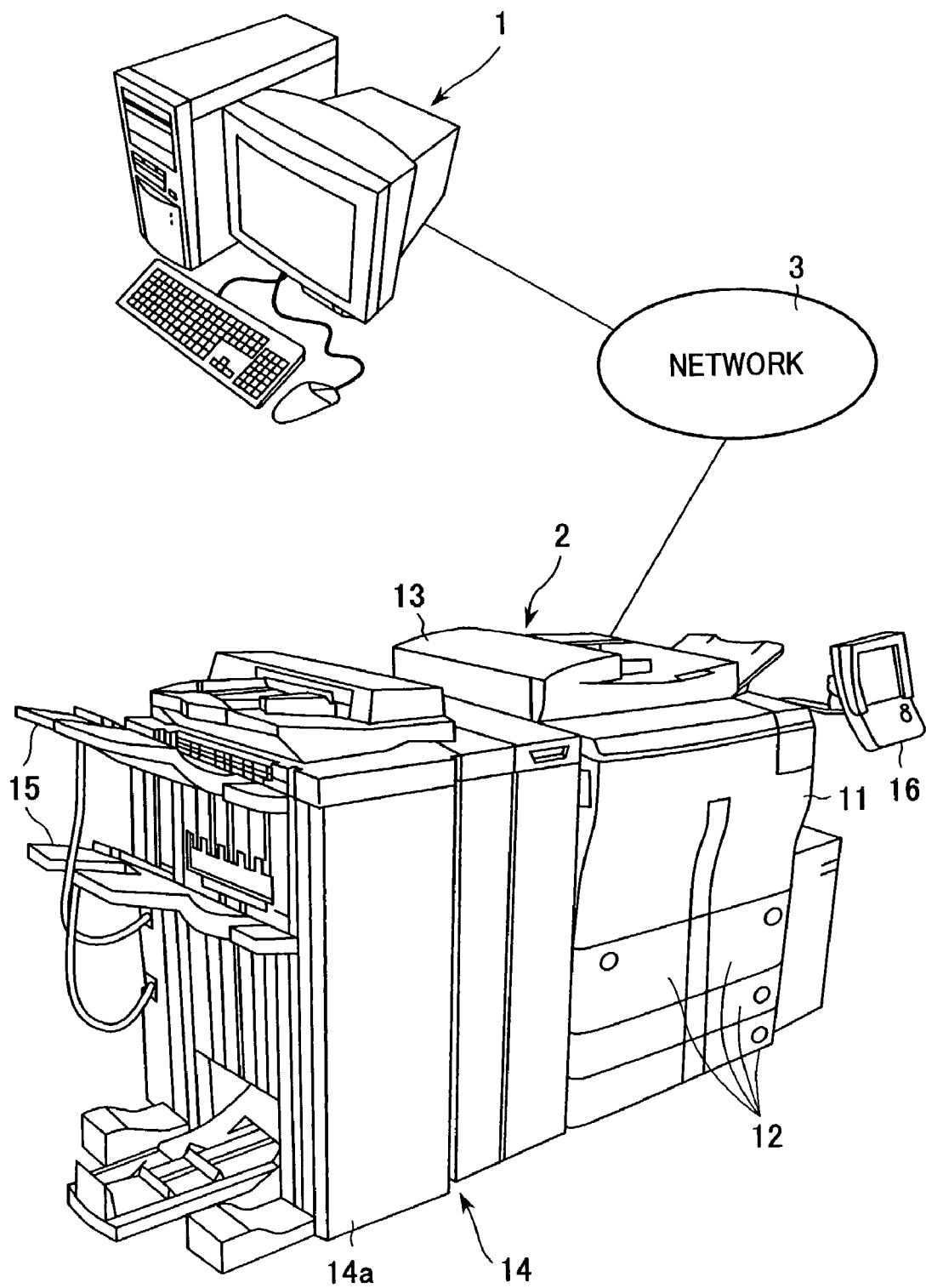
FIG. 1 is an overview of an image forming system to which the present invention is applied.

FIG. 1 shows an overview of an image forming system to which an image forming apparatus of the present invention is applied. In FIG. 1, reference numeral 1 denotes a terminal unit, reference numeral 2 denotes an image forming apparatus, and reference numeral 3 denotes a network connecting the terminal unit 1 and the image forming apparatus 2.

The terminal unit 1 executes various information processing operations by the operation of a user, and executes requests for output of image data to the image forming apparatus 2 via a network 3 by the operation of the user.

The image forming apparatus 2 receives an image output request from a user, uses electrophotographic technology, and forms an image of the received image data on recording paper. The image forming apparatus 2 generally consists of an image forming part 11 for forming an image of an object disposed at an upper part, a recording paper storage part 12 for storing recording paper, an image reading part 13, which is an image data reading means, a post-processing part 14, a paper-ejection tray part 15 for temporarily storing output recording paper, and an operation part 16.

The image forming part 11 uses electrophotographic technology in order to form an image on recording paper. Specifically, the part 11 generates line signals from image data, outputs optical signals from the line signals, and irradiates light onto a photosensitive drum. A latent image is formed on the photosensitive drum in accordance with the irradiated optical signals. The latent image forms an image using toner. The image is transferred onto a recording paper being conveyed in a main unit, and then the image on the recording paper is fixed by a fixing unit.

The recording paper storage part 12 is located under the image forming part 11 and is capable of storing a plurality of types of recording paper up to a certain amount. The recording paper of the type the user needs is conveyed to the above-described image forming part 11 by a control part of the image forming apparatus main-unit.

In the image reading part 13, as is well known, a light source scans a document, which is laid on a document table on the upper face of an input part with irradiating the document. The irradiated document image is sent to a charge coupled device CCD through an optical system, and the optical signal is transformed into electronic image data. Various compensation processing and image processing needed by the user is applied to the image data of the read document, and the image data is stored in an image memory of the control part of the image forming apparatus.

Also, in the image reading part 13, an automatic document conveyor is attached, thus a plurality of documents can be read automatically by the image reading part 13 to be stored into an image memory.

The sheet post-processing part 14 carries out additional processing, such as punch processing, staple processing, book binding, etc. on the recording paper on which image forming processing has been performed in the image forming part 11, and the operation is controlled by an internal control part.

The paper-ejection tray part 15 is a part for storing final image-forming result sheets output from the above-described sheet post-processing part 14. The paper-ejection tray part 15 has a structure in which the part is movable at arbitrary height with regard to a main unit 14a of the sheet post-processing part 14. The height can be controlled by the control part (not shown in the figure) in the above-described sheet post-processing part 14. As described later, the height of the paper-ejection tray part 15 can be set from the terminal unit 1.

The operation part 16 serves as an interface for the image forming apparatus 2 in order for a user to instruct the image forming apparatus 2 on detailed settings of various functions provided by the image forming apparatus 2. The operation part 16 is structurally movable upward and downward, thereby making it more convenient for a user, who is seated on a wheelchair, etc.

The network 3 is a bidirectional communication means for connecting various terminal units 1 and the image forming apparatus 2, and enabling to share the resources of these information technology devices among a plurality of users.

Figure 2:
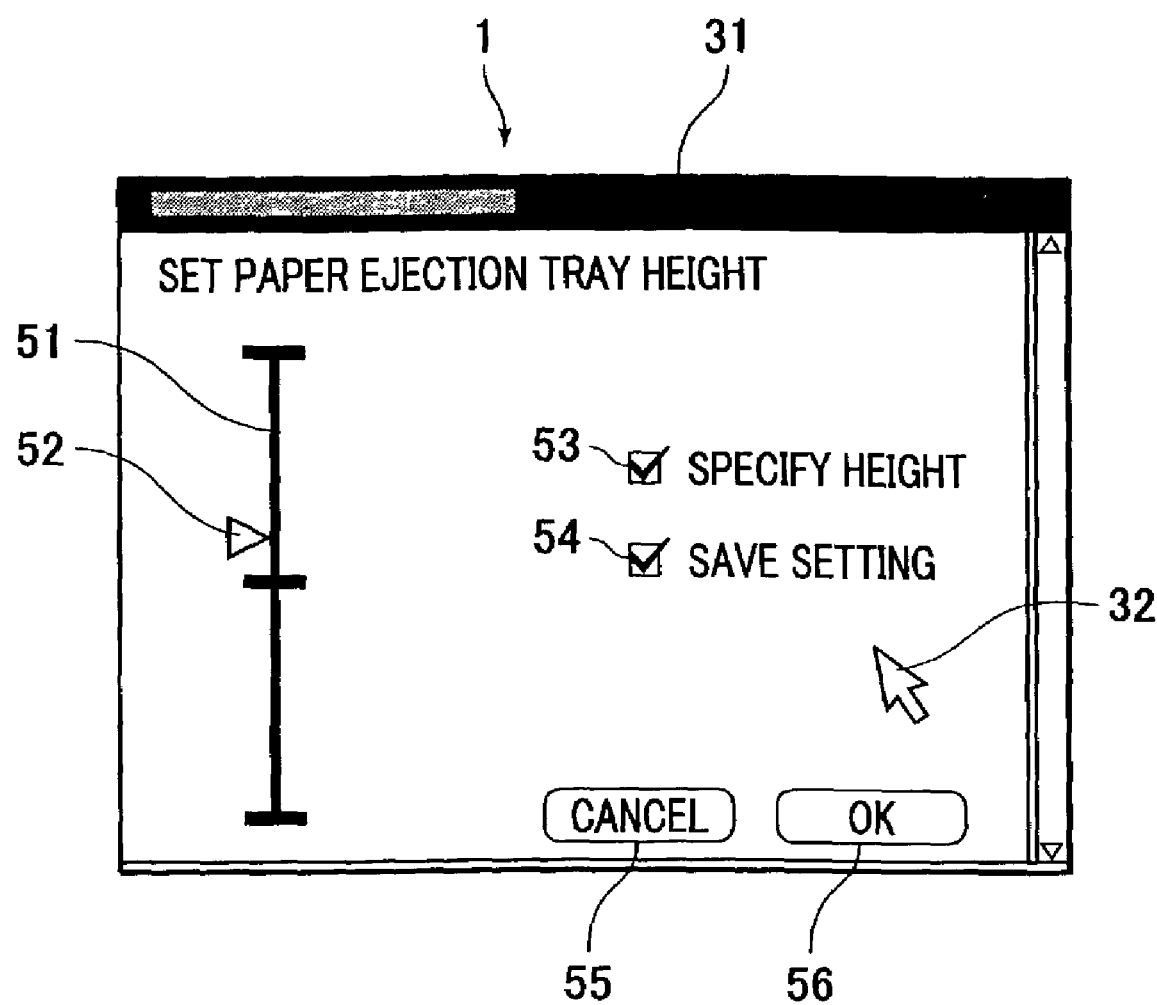
FIG. 2 is a diagram illustrating a specific example of setting a height of the paper-ejection tray part from the terminal unit of the present invention.

FIG. 2 is a display sample of the terminal unit 1, and shows a specific example of setting a height of the paper-ejection tray part 15 from the terminal unit 1. In the figure, reference numeral 31 denotes a height setting window of the paper-ejection tray part 15, reference numeral 32 denotes a cursor. On the height setting window, metaphors 51 to 56 are disposed in order for the user to set the height of the paper-ejection tray part 15 by sensory feeling.

Reference numeral 51 denotes a ruler indicating the range of height in which the user can specify for the output of the paper-ejection tray part 15 of the image forming apparatus. Reference numeral 52 denotes a setting pointer indicating the height of the paper-ejection tray part 15 to be specified by the user. The user moves the setting pointer 52 indicating the height of the paper-ejection tray part 15 within the range of the ruler 51 using the cursor 32 in order to specify the height of the paper-ejection tray part 15.

Reference numeral 53 denotes a check box for specifying the height of the paper-ejection tray part 15, and is a metaphor for setting whether the height specification of the paper-ejection tray part 15, which is set by the setting pointer 52, is used for the printout. If the check box 53 is checked as shown in the figure, image output result sheets are stored at the position of the height specified by the setting pointer 52 for the printout.

Reference numeral 54 denotes a check box for saving the setting, and is a metaphor for setting whether the height specification of the paper-ejection tray part 15, which is set by the setting pointer 52, is stored in the terminal unit 1. If the check box 54 is checked as shown in FIG. 2, when the setting screen is closed, the specification of the height of the paper-ejection tray part 15, etc., which has been set, can be stored in the terminal unit. The next time the setting window 31 is opened, the specification of the height of the paper-ejection tray part 15, etc., which was stored at previous time, are recalled. Also, when printout is carried out without setting, the stored specification of the height of the paper-ejection tray part is used.

Reference numeral 55 denotes a cancel button. It is a button for invalidating the setting information, and for closing the setting window. Reference numeral 56 denotes an OK button, and is a button for validating the setting information, and for closing the setting window.

Figure 3:
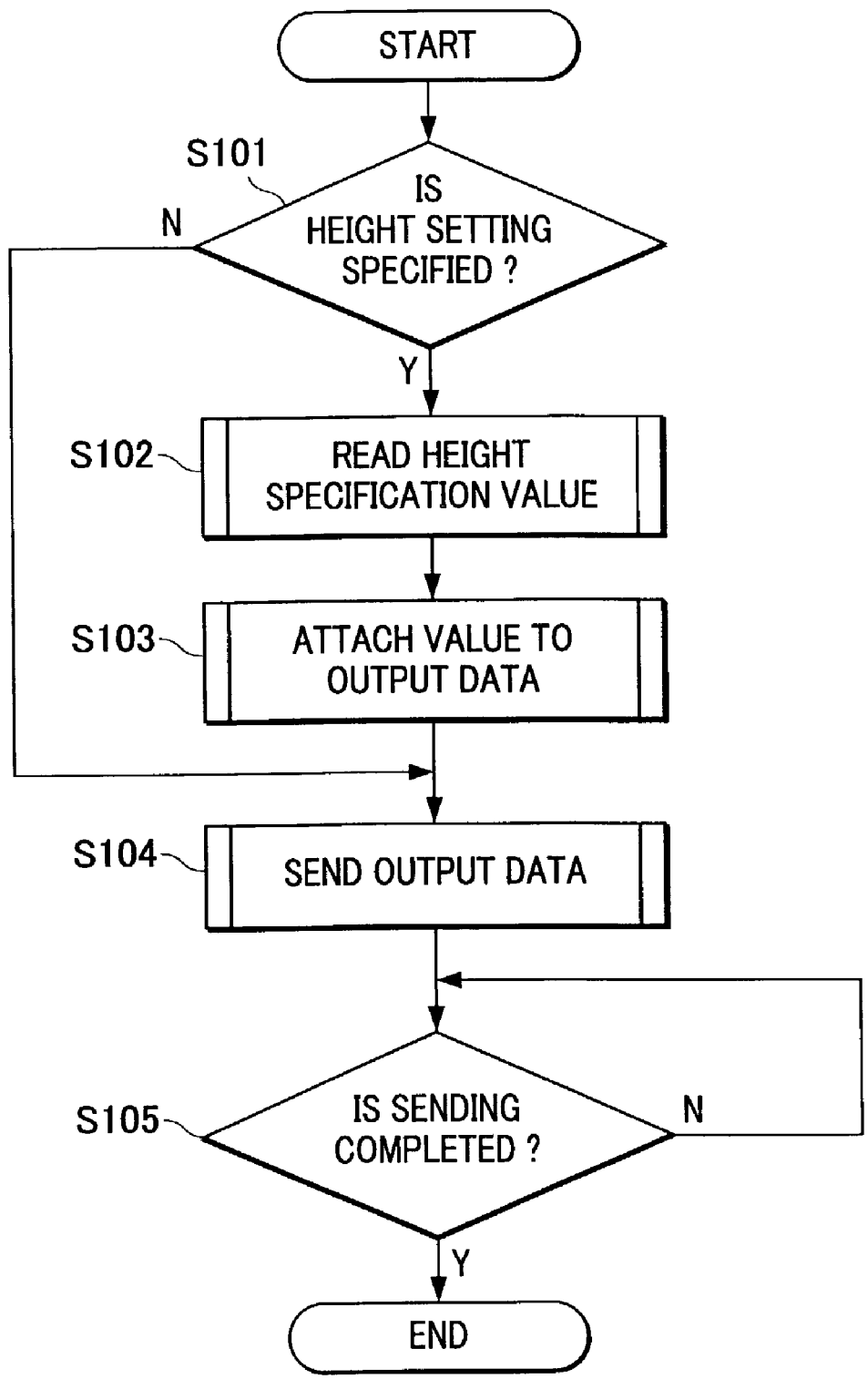
FIG. 3 is a flowchart illustrating control processing in the terminal unit when image output request processing occurs from a terminal unit to an image forming apparatus via a network.

FIG. 3 is a flowchart illustrating control processing in the terminal unit 1 when image output request processing occurs from a terminal unit 1 to an image forming apparatus 2 via a network 3.

After starting this processing, in step S101, it is determined whether the setting exists of the height specification of the paper-ejection tray part 15, which performs print storage against an output request. It is determined whether the check box 53 for setting the height specification of the paper-ejection tray part 15 described in FIG. 2 is checked. If the height is set, the processing goes to step S102. If the height is not set, the processing goes to step S104.

In step S102, processing is performed to read the height specification value of the paper-ejection tray, which is set by the user on the terminal unit 1, that is, the processing is performed to read the setting value corresponding to the height of the paper-ejection tray set by the setting pointer 52 described in FIG. 2, and the processing goes to step S103.

In step S103, processing is performed to attach the specification value of the paper-ejection tray, which is set on the terminal unit 1 read in the previous step S102, to the output data, and after attaching the data, the processing goes to step S104.

In step S104, processing is called to send image output data, which has been requested, to output by the user from the terminal unit 1 to the image forming apparatus 2. After calling for the image output data send routine, the processing goes to step S105.

In step S105, a loop is formed to wait for the completion of the sending of image output data requested in the previous step S104. After the sending of the image data is completed, the processing goes to end.

Figure 4:
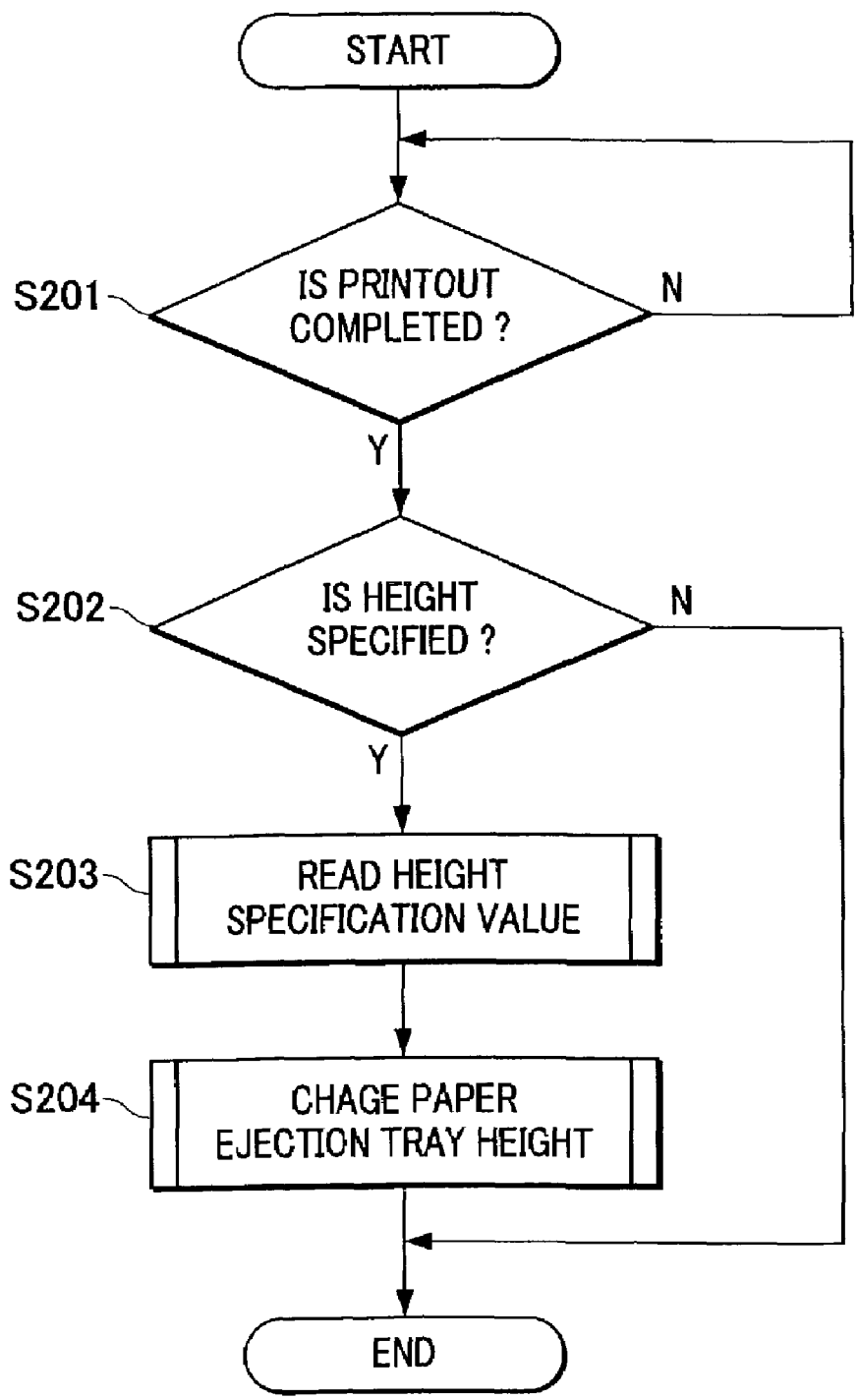
FIG. 4 is a flowchart illustrating height-movement processing of the paper-ejection tray part in an image forming apparatus, which performs image data output in response to a request from a terminal unit.

FIG. 4 is a flowchart illustrating height-movement processing of the paper-ejection tray part in an image forming apparatus, which performs image data output requested from a terminal unit 1.

This processing is executed in the control part in the post processing part 14 of the image forming apparatus 2, which performs image output, and is started when the image forming apparatus 2 receives printout request from the terminal unit 1 described in FIG. 3, and the output processing is started.

In step S201, a loop is formed to wait for the completion of the printout output processing from the terminal unit 1, which has been started at the timing of starting this processing. After completion of the printout, the processing goes to step S202.

In step S202, after the completion of the printout, it is determined whether the requested output data contains the specification of the paper-ejection height. If the paper-ejection height is specified, the processing goes to step S203. If the height is not specified, the processing goes to end.

In step S203, the height specification of the paper-ejection tray, which is attached to the requested output data is read, and after completion of reading, the processing goes to step S204.

In step S204, the processing is performed of moving the paper-ejection tray part 15 in accordance with the paper-ejection height, which has been read in the previous step S203. After completion of moving the paper-ejection tray part 15, the processing goes to end.

Figure 5:
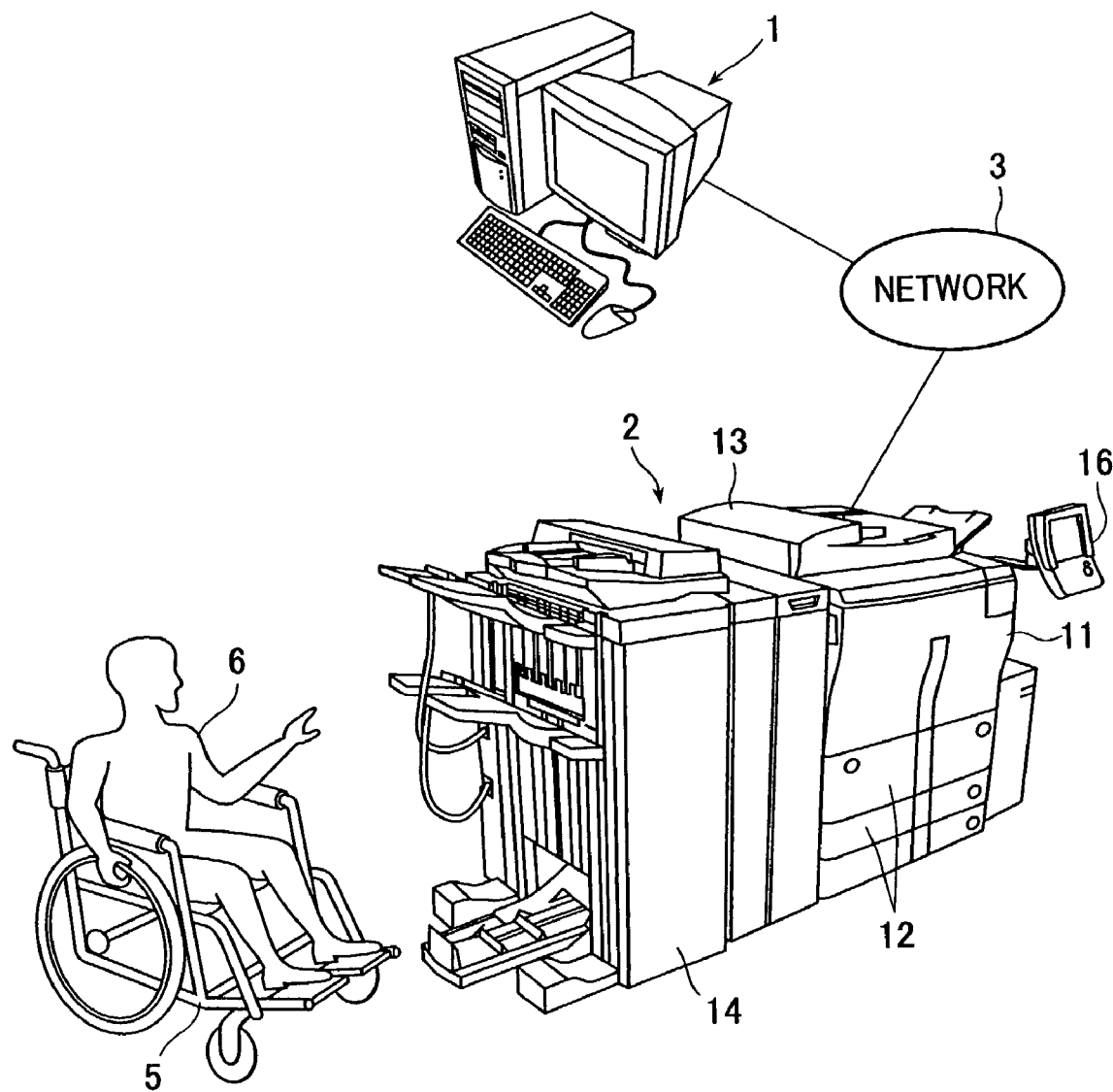
FIG. 5 is a diagram illustrating an appearance of using an image forming apparatus of the present invention by a user, who is seated on a wheelchair.

FIG. 5 is a diagram illustrating an appearance of using an image forming apparatus 2 of the present invention by a user, who is seated on a wheelchair.

As described in FIGS. 3 and 4, when an image forming output request is sent from the terminal unit 1 to the image forming apparatus 2 via a network 3, the specification value of the paper-ejection tray height is attached to the output data to be sent to the image forming apparatus 2. In the image forming apparatus 2, the specification value of the paper-ejection tray height 15 is read from the output data, and the height of the paper-ejection tray height 15 is controlled in accordance with the specification value. By this means, as shown in FIG. 5, even a user 6, who is seated on a wheelchair 5, can easily take out sheets from the paper-ejection tray height 15.

In this regard, the terminal unit 1 can register an identification code for identifying a user of the unit, and height information of the paper-ejection tray 15 for each of the identification codes in a database, and the height information of the paper-ejection tray 15 can be automatically sent based on the identification code entered by the user operating the terminal unit 1. By this means, setting the desired height of the paper-ejection tray becomes possible without setting an arbitrary height desired by the user who requested output in each case. Thus labor can be saved and convenience can be improved for the users.

Here, a description will be given of an internal structure in detail with quoting a description of Japanese Laid-Open Patent Application Publication No. 13-31320. For a structure having different drawing numbers, the structure of the present invention is added in parentheses as a reference.

Figure 6:
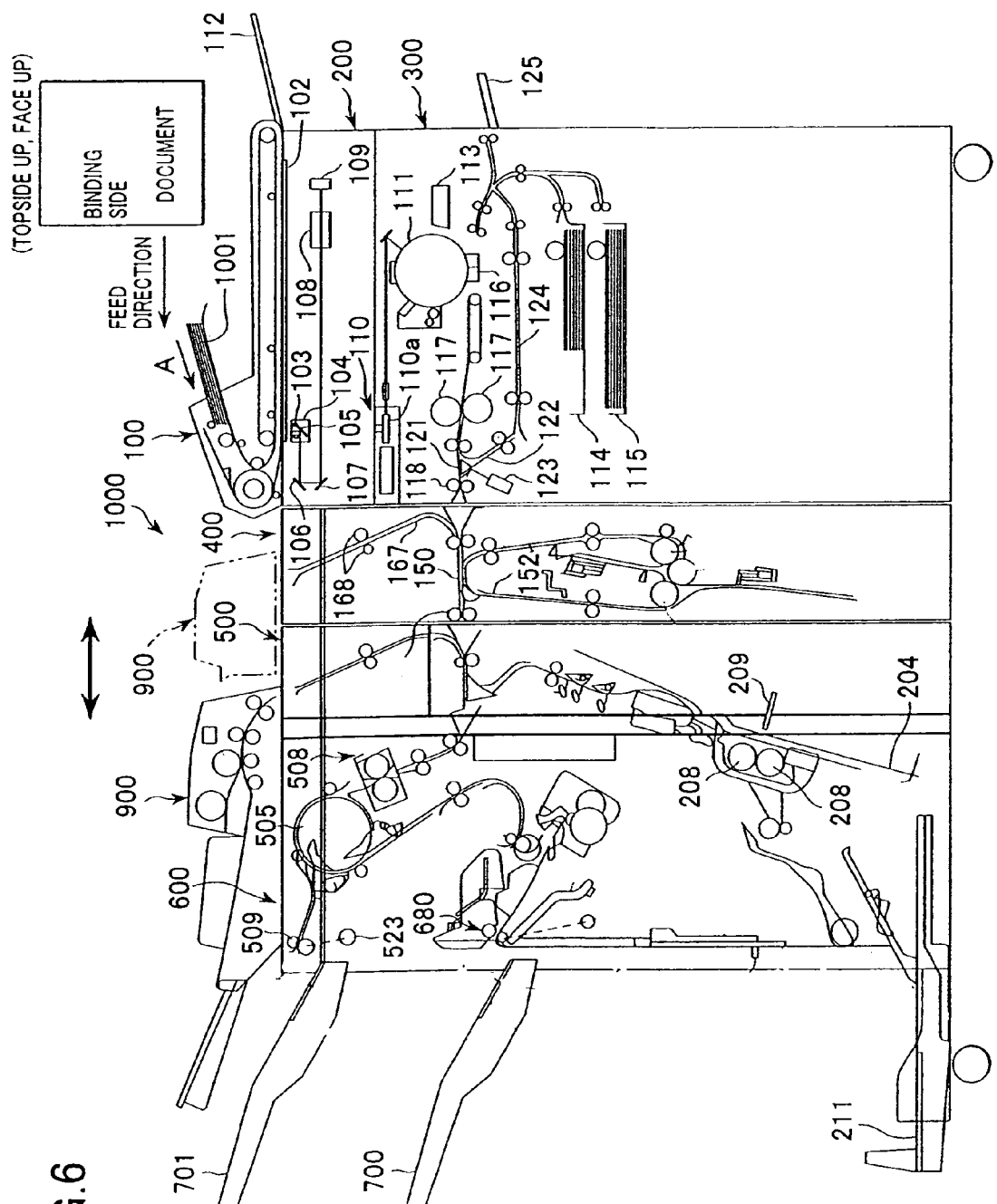
FIG. 6 is a schematic front sectional view of a copying machine, which is the image forming apparatus of an embodiment of the present invention.

FIG. 6 is a schematic front sectional view illustrating the internal structure of a copying machine 1000, which is an embodiment of the present invention.

The copying machine 1000 (image forming apparatus 2) has a document feed part 100 (image reading part 13), an image reader part 200 and image forming unit 300 (image forming part 11), a three-fold processing part 400 for folding a sheet in three, that is, folding a sheet in a Z-character-like manner, a two-fold processing part 500 for folding a sheet double, a finisher part 600 (post-processing part 14), and an inserter 900.

(Document Feed Part 100, Image Reader Part 200)

Referring to FIG. 6, suppose a document is set on a tray 1001 of the document feed part 100, as viewed from the user, in the state of topside-up and face-up (image formed face is upside). The binding side of the document is shown to be on the left side of the apparatus.

The document set on the tray 1001 is conveyed leftward (in the direction indicated by an arrow A) from the top page sequentially one-by-one, that is, feeding from the binding side. Then the document is conveyed on a platen glass 102 from left-to-right through a curved path, and then is ejected onto a paper-ejection tray 112.

In this regard, a scanner unit 104 is held at a predetermined position, and document read processing is performed by passing the document on the scanner unit 104 from left to right. This reading method is referred to as document move reading.

When the document passes on the platen glass 102, the document is irradiated by a lamp 103 of the scanner unit 104, and the reflected light from the document is directed into an image sensor 109 through mirrors 105, 106, 107, and a lens 108.

In this regard, the document conveyed from the document feed part 100 may be temporarily stopped on the platen glass 102, and the document read processing can be performed by moving the scanner unit 104 from left to right in that state. This reading method is referred to as "document fixed reading".

When performing document read without using the document feed part 100, the user lifts up the document feed part 100, and sets the document on the platen glass 102. In this case, the document fixed reading described above is performed.

(Image Forming Unit)

The image data read by the image sensor 109 receives a predetermined image processing, and is sent to an exposure control part 110. The exposure control part 110 outputs laser light corresponding to the image signal. The laser light is irradiated onto a photosensitive drum 111 with scanning by a polygon mirror 110a. An electrostatic latent image is formed on the photosensitive drum 111 in accordance with the scanned laser light.

The electrostatic latent image formed on the photosensitive drum 111 is developed by a development unit 113, and is visualized into a toner image. At the same time, a sheet is conveyed from any one of the cassettes 114 and 115, a manual paper feeding part 125, and a double-sided convey path 124 to a transfer part 116.

The visualized toner image is transferred onto a sheet at the transfer part 116. The transferred sheet undergoes fixing processing at the fixing part 117.

Then the sheet which has passed the fixing part 117 is temporarily led to a path 122 by the rotation of a flapper 121 by the operation of a plunger 123. After the back end of the sheet has passed the flapper 121, the sheet is switched back, and is conveyed to a pair of ejection rollers 118 by the flapper 121. Then the sheet is ejected from the image forming unit 300 by the pair of ejection rollers 118.

By this means, the sheet can be ejected from the image forming unit 300 in the state in which the toner-image formed side is face down. This is referred to as "reversal ejection".

By ejecting a sheet outside the apparatus face down, when performing image forming processing from the top page in sequence, for example, performing image processing using the document feed part 100, or performing image processing on the image data from a computer, the page sequence can be organized.

In this regard, when performing image forming processing on a hard sheet such as an OHP sheet, which is conveyed from the manual paper feeding part 125, the sheet is ejected from the image forming unit 300 by the pair of ejection rollers 118 in a state in which the toner-image formed face is up (face up) without leading the sheet into the path 122.

Also, when performing image forming processing on both sides of a sheet, the sheet is led from the fixing part 117 to the pair of ejection rollers 118, the sheet is switched back immediately after the back end of the sheet passes the flapper 121, and is led to a double-sided conveyor path by the flapper 121.

(Three-fold Processing Part 400)

Referring to FIG. 6, the sheet ejected from the image forming unit 300 by the pair of ejection rollers 118 is sent to the conveyor passage 150 of the three-fold processing part 400. The three-fold processing part 400 carries out three-fold processing so as to fold a sheet in a Z-character-like state. For example, when a sheet is an A3 size or a B4 size, and folding processing is specified in the operation part, the folding processing is performed on the sheets ejected from the image forming unit 300.

On the other hand, in the other cases, without performing fold processing on the sheet ejected from the image forming unit 300, the sheet is either sent to the two-fold processing part 500, or is passed through the two-fold processing part 500 to be directly sent to the finisher 600.

In this regard, as shown in FIG. 6, the three-fold processing part 400 has an auxiliary conveyor passage 167 connected to a receiving conveyor passage 152 and an auxiliary pair of conveyor rollers 168 in order to allow receiving a sheet from the inserter 900 described later to fold the sheet in three.

(Two-fold Processing Part 500)

Figure 7:
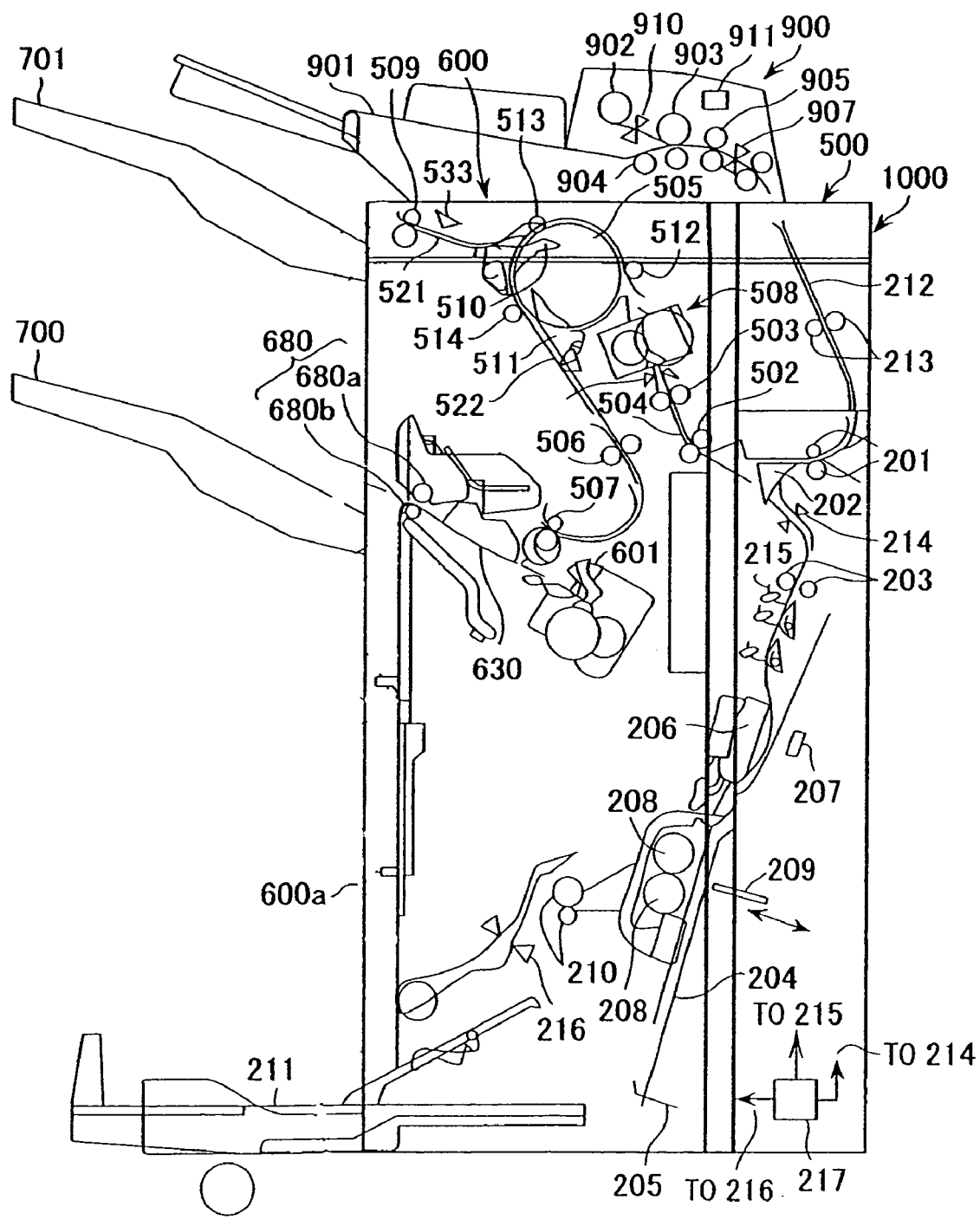
FIG. 7 is a schematic front view of a two-fold processing part and a finisher.

Referring to FIG. 7, in the two-fold processing part 500, the sheet which has passed through the three-fold processing part 400 (refer to FIG. 6) is either stitched into a bundle of sheets or is not stitched based on an instruction of the operation part, is two-fold processed, and ejected outside of the copying machine 1000.

The sheet, which has passed through the three-fold processing part 400, is conveyed by the entrance rollers 201, is guided to the flapper 202, and is contained in the container guide 204 through the conveyor rollers 203. If the sheet does not receive two-fold processing at the two-fold processing part 500, the sheet is guided to the finisher 500 by the flapper 202.

The sheet conveyed by the conveyor rollers 203 is conveyed in sequence for a predetermined number of sheets until the top end of the sheet contacts a movable sheet-positioning member 205, and is pooled in a bundle in the sheet-positioning member 205.

Also, two pairs of staplers 206 are provided at the downstream side of the conveyor rollers 203, that is, in the middle position of the container guide 204, and an anvil 207 is provided at the position facing the staplers 206. The staplers 206 stitch down the middle of a bunch of sheets together with the anvil 207.

A pair of folding rollers 208 is provided at the downstream side of the staplers 206, and a protruding member 209 is provided at the facing position of the pair of folding rollers 208. By protruding the protruding member 209 toward the bundle of sheets contained in the container guide 204, the bundle of sheets is pressed between the pair of folding rollers 208, and is folded by the pair of folding rollers 208. Then, the bundle of sheets is ejected to an ejection tray 211 via a paper-ejection roller 210.

Also, when folding the bundle of sheets stitched by the staplers 206, after the staple processing is completed, a positioning member 823 is moved downward a predetermined distance from the position of the staple processing in accordance with the sheet size such that a staple position of the bundle of sheets becomes the central position (nip position) of the pair of folding rollers 208. By this means, the bundle of sheets can be folded with positioning the staple processing point at a center.

In this regard, similarly as the three-fold processing part 400, the two-fold processing part 500 has an auxiliary conveyor passage 212 connected to an entrance roller 201 and an auxiliary pair of conveyor rollers 213 in order to allow receiving a sheet from the inserter 900 described later to fold the sheet double, or to send the sheet to the finisher 600 without folding the sheet double.

At the entrance of the two-fold processing part 500, an entrance sensor 214 for detecting the entering of a sheet is provided, a size-detecting sensor 215 for detecting the size of the passing sheet is provided at the downstream side of the conveyor rollers 203, and an ejection sensor 216 for detecting the ejection of the bundle of sheets is provided near the exit.

The two-fold processing part 500 is controlled by a two-fold control part 217 shown in FIG. 7.

(Inserter 900)

In FIG. 7, the inserter 900 is used when feeding, for example, front cover sheets without passing through the image forming unit 300.

The bundle of sheets piled on a tray 901 is conveyed to a separation part comprising of a conveyor roller 903 and a separation belt 904 by the paper-feed roller 902. Then the sheets are separated from the top of the sheets one-by-one by the conveyor roller 903 and the separation belt 904. Then the separated sheet is conveyed to the auxiliary conveyor passage 212 of the two-fold processing part 500 by a pair of pull-out rollers 905 adjacent to the separation part.

In this regard, a paper-set sensor 910, which detects whether a sheet is set, is provided between the paper-feed roller 902 and the conveyor roller 903. Also, in the vicinity of the pair of pull-out rollers 905, a paper-feed sensor 907, which detects whether the sheet has conveyed by the pair of pull-out rollers 905, is provided.

Also, the inserter 900 may be provided in the three-fold processing part 400 in addition to the two-fold processing part 500, and the sheet may be supplied to the auxiliary conveyor passage 167 of the three-fold processing part 400.

The inserter 900 is controlled by an inserter control part 911 shown in FIG. 7.

(Finisher 600)

In FIG. 7, the finisher 600 fetches a sheet conveyed from the image forming unit 300 through the two-fold processing part 500, performs sheet post-processing, etc., for example, bundle processing, which aligns a plurality of sheet fetched into a bundle of sheets; staple processing (stitching processing), which staples the back end side of the bundle of sheets; sort processing; nonsort processing; book binding processing; and so on.

As shown in FIG. 7, the finisher 600 has a finisher path 504 provided with a pair of entry rollers 502, which fetches the conveyed sheet from the image forming unit 300 through the two-fold processing part 500 into the inside of the unit, and a pair of conveyor rollers 503.

The sheet led by the finisher path 504 is conveyed toward a buffer roller 505 through the pair of conveyor rollers 503. In this regard, the pair of conveyor rollers 503 and the buffer roller 505 are capable of reversal rotation.

An entrance sensor 531 is provided between a pair of entrance rollers 502 and a pair of conveyor rollers 503.

A punch unit 508 described later is provided between a pair of conveyor rollers 503 and the buffer roller 505. The punch unit 508 is operated as necessary in order to perform punch processing on the vicinity of the back end of the conveyed sheet through the pair of conveyor rollers 503.

The buffer roller 505 is a roller capable of being wound by the sheet conveyed through the pair of conveyor rollers 503 for a predetermined number of pieces, and the sheet is wound by pressing rollers 512, 513, and 514 during the rotation of the roller 505. The sheet wounded around the buffer roller 505 is conveyed in the direction of the rotation of the buffer roller 505.

A switching flapper 510 is provided between the pressing roller 513 and the pressing roller 514, and a switching flapper 511 is provided downstream of the pressing roller 514. The switching flapper 510 separates the sheet wounded around the buffer roller 505, and leads it to either a nonsort path 521 or a sort path 522.

The switching flapper 511 separates the sheet wound around the buffer roller 505, and leads it to the sort path 522, and also leads it to a buffer path 523 in a state in which the sheet is wound around the buffer roller 505.

The sheet led to the nonsort path 521 by the switching flapper 510 is ejected on a sample tray 701 through a pair of ejection rollers 509. Also, in the middle of the nonsort path 521, a jam-detection paper ejection sensor 533 is provided.

At the same time, the sheet led to the sort path 522 by the switching flapper 510 is piled on an intermediate tray 630 through a pair of conveyor rollers 506 and 507. A bundle of sheets piled in a state of a bundle on the intermediate tray 630 undergoes alignment processing and staple processing in accordance with the settings of the operation part 303 (refer to FIG. 2), and then is ejected onto a stack tray 700 by the ejection rollers 680a and 680b.

In this regard, the above-described staple processing is carried out by the stapler 601. The sample tray 701 and the stack tray 700 (paper-ejection tray part 15) are structurally movable upward and downward.

(Punch Unit 508 of the Finisher 600)

In FIGS. 6 and 7, the punch unit 508 is disposed lengthwise in a vertical direction of the drawing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus to which an image output is requested by an operation of a terminal unit, said image forming apparatus comprising:
   a paper-ejection tray, which stores an image-formed sheet, and which is disposed adjacent to a sheet-post-processing part of said image forming apparatus in a vertically movable manner,
   wherein a height to which said paper-ejection tray can be arbitrarily moved is set in response to a request for an image output from the terminal unit and independently of any other image output request.

2. An image forming apparatus according to claim 1,
   wherein the terminal unit registers an identification code, which identifies a user of the terminal unit, and paper-ejection-tray height information associated with the identification code in a database, and
   wherein the paper-ejection tray height information is attached to image data for forming an image-formed sheet and is automatically sent to said image forming apparatus based on an identification code entered by a user operating the terminal unit along with the request for the image output.

3. An image forming apparatus according to claim 1, wherein the terminal unit is connected to said image forming apparatus via a network, and
   wherein the request for the image output is provided to said image forming apparatus via the network by an operation of the terminal unit.

4. An image forming apparatus to which an image output is requested by an operation of a terminal unit, said image forming apparatus comprising:
   a paper-ejection tray for receiving an image-formed sheet, said paper-ejection tray being disposed adjacent to a sheet-post-processing part,
   wherein said paper-ejection tray is vertically movable and a height to which said paper-ejection tray can be arbitrarily moved is set in response to a request for an image output from the terminal unit and independently of any other image output request.

5. An image forming apparatus according to claim 4,
   wherein the terminal unit registers an identification code, which identifies a user of the terminal unit, and paper-ejection tray height information associated with the identification code in a database, and
   wherein the paper-ejection tray height information is attached to image data for forming an image-formed sheet and is automatically sent to said image forming apparatus based on an identification code entered by a user operating the terminal unit along with the request for the image output.

6. An image forming apparatus according to claim 4, wherein the terminal unit is connected to said image forming apparatus via a network, and
   wherein the request for the image output is provided to said image forming apparatus via the network by an operation of the terminal unit.

7. An image forming apparatus according to claim 4, wherein said paper-ejection tray receives sorted image-formed sheets.

8. An image forming apparatus according to claim 4, further comprising a plurality of paper-ejection trays,
   wherein at least one of said plurality of paper-ejection trays receives nonsorted image-formed sheets.

9. An image forming apparatus to which an image output is requested by an operation of a terminal unit, said image forming apparatus comprising:

a paper-ejection tray for receiving an image-formed sheet, wherein said paper-ejection tray is disposed adjacent to a sheet-post-processing part and is vertically movable;

control means for causing said paper-ejection tray to move to an arbitrary height set in response to a request for an image output from the terminal unit; and holding means for holding said paper-ejection tray at the set height, wherein the terminal unit registers an identification code, which identifies a user of the terminal unit, and paper-ejection-tray height information associated with the identification code in a database and wherein the paper-ejection tray height information is attached to image data for forming an image on a sheet and is automatically sent to said image forming apparatus based on an identification code entered by a user operating the terminal unit along with the request for the image output and independently of any other image output request.

10. An image forming apparatus to which an image output is requested by an operation of a terminal unit, said image forming apparatus comprising:

a paper-ejection tray, which stores an image-formed sheet, and which is disposed in a vertically movable manner at a sheet-post-processing part of said image forming apparatus; and a control part responsive to a request for an image output from the terminal unit, wherein a height to which said paper-ejection tray can be arbitrarily moved is set by said control part based on a request for an image output from the terminal unit and independently of any other image output request.

11. An image forming apparatus according to claim 10, wherein the terminal unit registers an identification code, which identifies a user of the terminal unit, and paper-ejection tray height information associated with the identification code in a database, and wherein the paper-ejection tray height information is attached to image data for forming an image-based sheet and is automatically sent to said image forming apparatus based on an identification code entered by a user operating the terminal unit along with the request for the image output.

12. An image forming apparatus according to claim 10, wherein the terminal unit is connected to said image forming apparatus via a network, and wherein the request for the image output is provided to said image forming apparatus unit via the network.

13. A control method for moving a paper-ejection tray of an image forming apparatus to an arbitrarily set height from a terminal unit, said control method comprising the steps of:

requesting an image output by an operation of the terminal unit; and requesting moving a paper-ejection tray of the image forming apparatus to a height arbitrarily set by an operation of the terminal unit independently of any other image output request.

14. A control method according to claim 13, further comprising the steps of:

registering an identification code, which identifies a user of the terminal unit, and paper-ejection tray height information associated with the identification code in a database; and attaching paper-ejection tray height information based on an identification code entered by a user operating the terminal unit to image data for forming an image-formed sheet.

15. A control method according to claim 14, further comprising the step of:

sending the request for the image output and the attached paper-ejection tray height information from the terminal unit to the image forming apparatus via a network.

16. A control method according to claim 14, further comprising the step of:

maintaining identification codes for a plurality of users of the terminal unit in the database.

17. A control method of control processing in a terminal unit connected to an image forming apparatus, said control method comprising the steps of:

requesting an image output by an operation of the terminal unit;

determining a height specification value specifying a height to which a paper-ejection tray of the image forming apparatus is to be moved for a user of the terminal unit;

attaching a determined height specification value to image data for forming an image on a sheet; and sending the image data along with the attached height specification value from the terminal unit to the image forming apparatus independently of any other image output request.

18. A control method according to claim 17, further comprising the steps of:

registering an identification code, which identifies a user of the terminal unit, and paper-ejection tray height information associated with an identification code in a database, wherein the height specification value is based on an identification code entered by a user operating the terminal unit.

19. A control method according to claim 17, wherein the image output and the height specification value are sent from the terminal to the image forming apparatus via a network.

20. An image forming system comprising:

a terminal unit; and an image forming apparatus to which an image output is requested by an operation of said terminal unit, said image forming apparatus including:

a paper-ejection tray, which stores an image-formed sheet, and which is disposed adjacent to a sheet-post-processing part of said image forming apparatus in a vertically movable manner; and a control part responsive to a request for an image output from said terminal unit, wherein a height to which said paper-ejection tray is moved can be arbitrarily set by said control part in response to a request for an image output from said terminal unit and independently of any other image output request.

21. An image forming system according to claim 20, wherein said terminal unit registers an identification code, which identifies a user of said terminal unit, and paper-ejection tray height information associated with the identification code in a database, and wherein the paper-ejection tray height information is automatically sent to said image forming apparatus based on an identification code entered by a user operating said terminal unit along with the request for the image output.

22. An image forming system according to claim 20, wherein said terminal unit is connected to said image forming apparatus via a network, and wherein the image output is requested by an operation of said terminal unit.

* * * * *

UNITED STATES PATENT AND TRADEMARK OFFICE
CERTIFICATE OF CORRECTION

| | |
|---|---|
| PATENT NO. | : 7,154,615 ZB2 |
| APPLICATION NO. | : 10/277748 |
| DATED | : December 26, 2006 |
| INVENTOR(S) | : Tomoyasu Yoshikawa |

It is certified that error appears in the above-identified patent and that said Letters Patent is hereby corrected as shown below:

COLUMN 1:
Line 57, "when" should be deleted.

COLUMN 4:
Line 8, "for" should read --a height for--.

COLUMN 8:
Line 54, "has" should read --has been--.
Line 66, "sheet" should read --sheets--.

COLUMN 9:
Line 24, "wounded" should read --wound--.
Line 31, "wounded" should read --wound--.

Signed and Sealed this

Tenth Day of July, 2007

JON W. DUDAS
*Director of the United States Patent and Trademark Office*